Aug. 26, 1958
A. E. FRIDOLPH
2,849,249
CLAMPING DEVICE
Filed Oct. 20, 1955
2 Sheets-Sheet 1
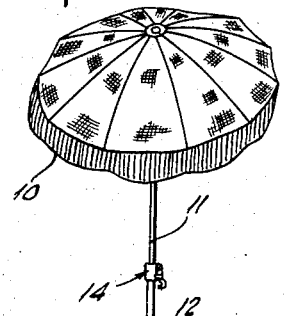
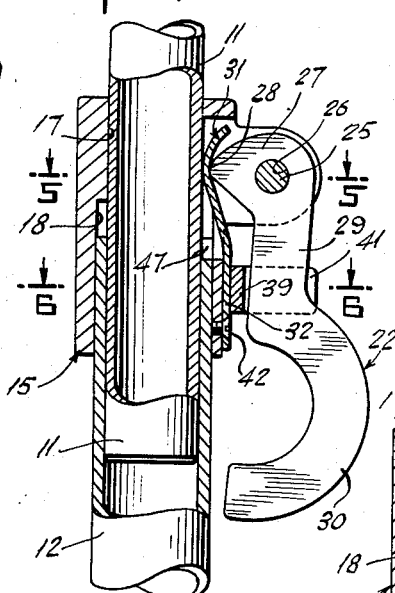
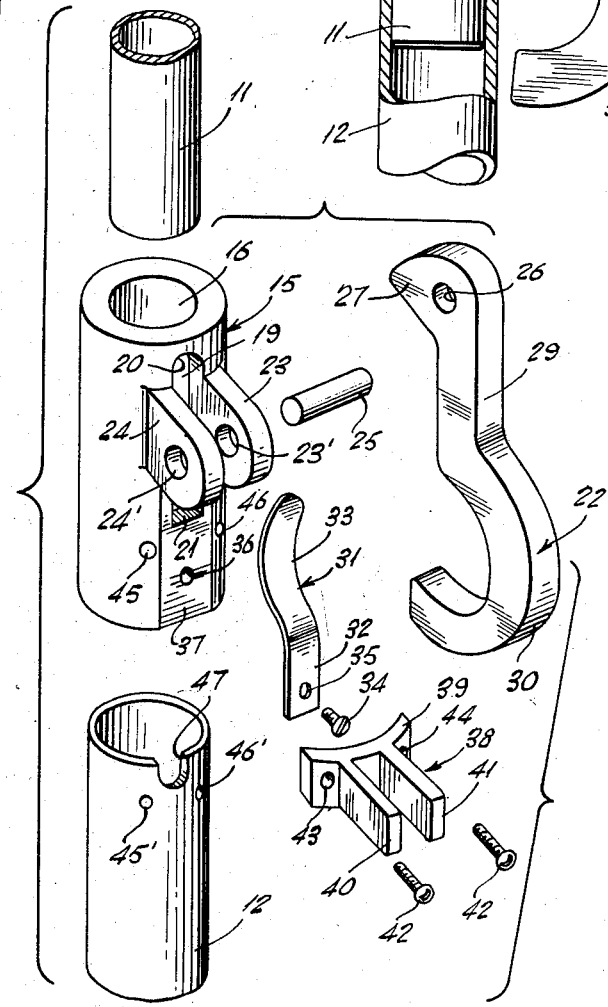
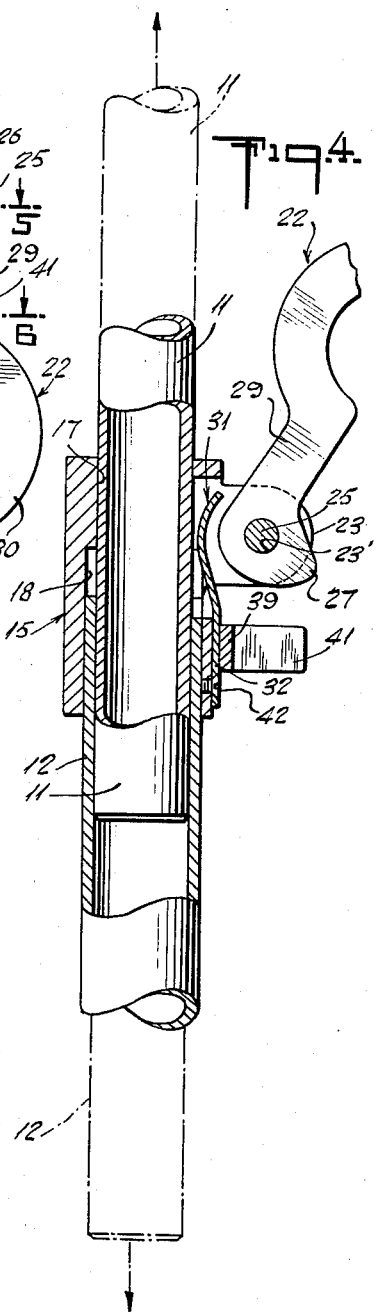
INVENTOR
ANNETTE E. FRIDOLPH
BY
ATTORNEY Aug. 26, 1958 A. E. FRIDOLPH 2,849,249
CLAMPING DEVICE
Filed Oct. 20, 1955 2 Sheets-Sheet 2
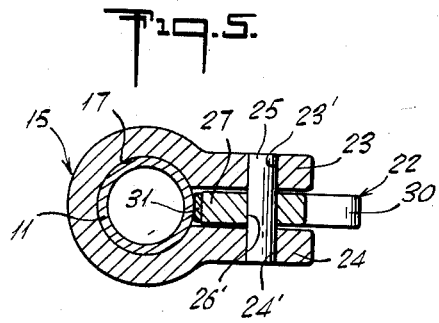
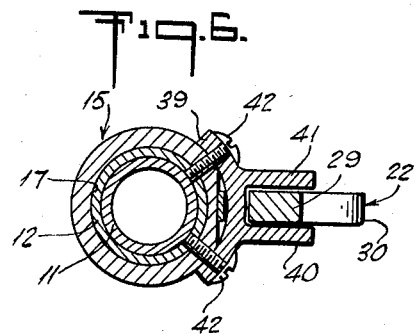
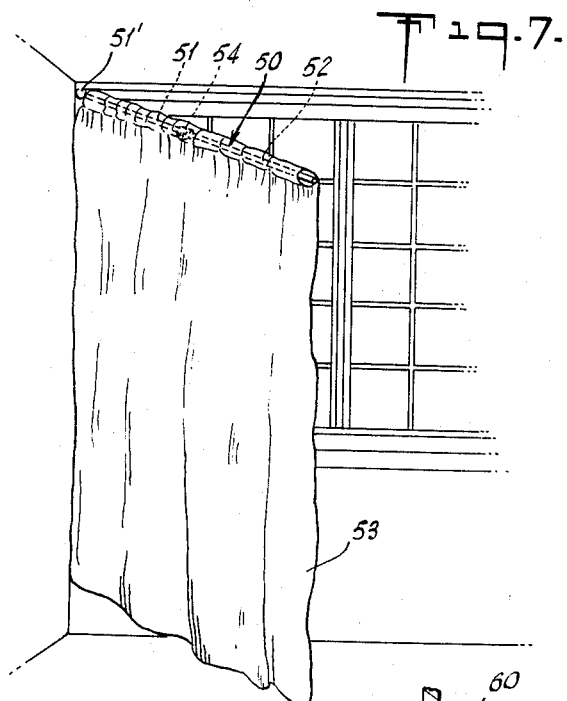
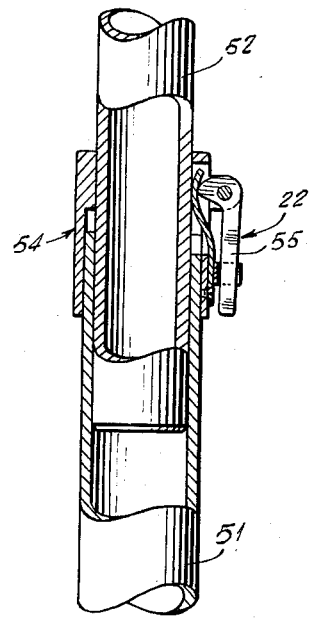
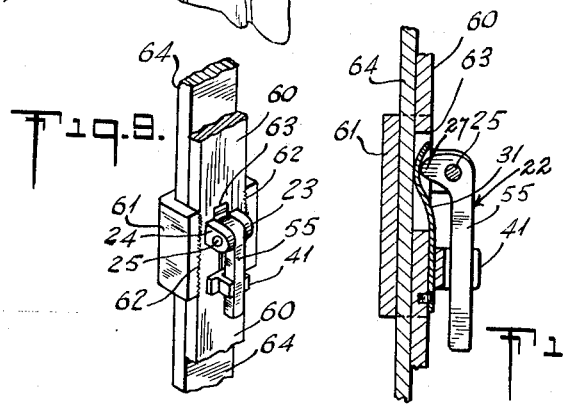
INVENTOR
ANNETTE E. FRIDOLPH
BY
ATTORNEY

United States Patent Office 2,849,249
Patented Aug. 26, 1958

2,849,249
CLAMPING DEVICE
Annette E. Fridolph, New York, N. Y.

Application October 20, 1955, Serial No. 541,767

1 Claim. (Cl. 287—58)

This invention relates to clamping devices for relatively slidable and telescoping members and more specifically to a clamp having readily releasable clamping means for securing relatively slidable members one to the other as in the case of sun shade stands, tripod legs for cameras, drapery rods and the like, and in the case of cylindrical or round elements for adjustably fixing them in any desired relative angular position.

A variety of clamping devices for clamping telescoping elements in extended positions have been proposed but known structures have been found to be unsatisfactory either because they are adjustable only to predetermined fixed positions or, in the case of friction devices, they are difficult to operate by hand and are generally limited to use on cylindrical members of relatively small diameter. In the latter case the clamp generally consists of a threaded end portion on the outer element having a slight taper and several longitudinal slots. A cooperating nut engages the threads and when the inner element is positioned within the outer element, the nut is tightened to hold the two elements together. The difficulty with this structure arises, particularly in devices intended for hand operation, when dirt or other foreign matter becomes forced between the threads or the threads corrode. In addition the threaded end portion frequently is worn or deformed to such an extent that the segments of the threaded end portion no longer can be forced inwardly easily to grip the inner elements, or if forced inwardly with too great a pressure cannot be easily released for adjustment of the members.

Accordingly one object of the invention resides in a novel and improved clamp for telescoping and other relatively slidable elements that overcomes the disadvantages of prior devices and is characterized by its low cost, simplicity, ease of operation and relatively long life notwithstanding the presence of dirt or corrosion. Moreover the clamp by reason of its design and arrangement of elements can be made exceedingly compact and its ease of operation and effectiveness is not materially affected by the nature of its use. The invention also may be arranged either for manual operation or for operation by means of a suitable tool.

Another object of the invention is the provision of an improved clamp for holding telescoping elements of any size or shape in any desired position one relative to the other. It provides in effect an infinite number of adjusted positions of the elements and in the case of round elements, they can be secured not only in any extended position but also in any relative angular position.

A further object of the invention is a new and improved adjustable clamp for releasably securing sliding members one to the other and that is readily adaptable for use with members of a wide variety of sizes and shapes.

The above and other objects and advantages will become more apparent from the following description and accompanying drawings forming part of this application.

In the drawings:

Fig. 1 is a perspective view of a sun shade having an adjustable supporting rod or pole formed of two telescoping elements and utilizing a clamp in accordance with the invention for releasably holding the pole elements in position one relative to the other;

Fig. 2 is an enlarged exploded view of the clamp shown in Fig. 1;

Fig. 3 is an enlarged cross sectional view of the assembled clamp shown in Figs. 1 and 2 in the locked position;

Fig. 4 is a cross sectional view of the clamp shown in Fig. 3 but in the unlocked position;

Figs. 5 and 6 are cross sectional views of Fig. 3 taken along the lines 5—5 and 6—6 thereof;

Fig. 7 is a perspective view of a modified clamp used to releasably secure telescoping members of a drapery rod;

Fig. 8 is a cross sectional view of the modified clamp shown in Fig. 7;

Fig. 9 is a perspective view of another embodiment of the invention; and

Fig. 10 is a longitudinal cross sectional view of Fig. 9.

While the invention has been illustrated in the drawings as a clamp for cylindrical telescoping members of a sun shade pole and drapery rod, it will become apparent that it may be used as well on rectangular or any polygonal element, telescoping table tops, extensible bumpers for automotive vehicles wherein the bumpers are supported by one or more elements slidably supported in collars or other similar means and the like.

Referring now to the drawings and more specifically to Figs. 1 through 6 thereof, a sun shade denoted by the numeral 10 is supported by a single center rod formed of two telescoping elements 11 and 12. The lower and larger element 12 is provided in this application with a pointed end part 13 for insertion in the ground. The upper element 11 of the rod is arranged to be slidably received within the lower element 12 and the two elements are held in any desired extended or contracted position by the improved clamp 14 on the upper end of the rod element 12. This clamp is more clearly shown in Figs. 2 through 6 and will now be described.

Inasmuch as the telescoping elements 11 and 12 are of circular section, the clamp body 15 is circular in shape and is provided with an opening 16 extending therethrough. The upper section 17 of this opening 16 is arranged to slidably receive the element 11 while the lower portion 18 of the opening is large enough to snugly receive the lower shaft part 12.

The wall of the body 15 is provided with an elongated slot 19 having a rounded upper end 20 and a rectangular lower end 21. The slot 19 extends upwardly to a point encompassing at least part of the narrowed section 17 of the central opening 16 so that pressure applied by means of the lever generally denoted by the numeral 22 through the upper section of this slot will bear on the upper telescoping element 11 at a point where it is completely surrounded by the body 15.

The lever 22 illustrated in this embodiment of the invention is pivotally coupled to the body 15 by means of a pair of outstanding lugs 23 and 24 having aligned openings 23' and 24' therein. A pin 25 extends through these openings and engages an opening 26 in the upper end of the lever 22. The upper portion of the lever 22, illustrated for instance in Fig. 3, is in the form of an eccentric cam 27 with the cam part 28 functioning to apply pressure to the tubing 11 when the lever 22 is in the closed position as shown in Fig. 3. The cam 27 is actuated by a handle having a downwardly extending straight portion 29 terminating in an outwardly curved portion 30 acting as a finger hold.

In order to precent abrasion of the telescoping element 11 by the action of the lever 22, a flat strip 31 of any suitable material is disposed in the slot 19 and is urged against the element 11 by the action of the lever 22. This strip is preferably provided with a straight lower portion 32 and a curved upper part 33 adapted to be disposed within the slot. It is fastened in place on the body 15 by means of a screw 34 which engages the opening 35 in the lower part 32 and threadably engages an opening 36 in the lower portion of the body 15 and in alignment with the slot 19. If desired the body 15 may be provided with a flattened portion 37 extending downwardly from the lugs 23 and 24 in order to provide a firm mount for the strip 31. Since the width of the strip 31 is only slightly smaller than the width of the slot 19 a single screw 34 is sufficient to maintain it in position on the clamp.

The clamp 14 may be secured to the lower telescoping element 12 in any suitable manner, as for instance, by providing a pressed fit, or by welding, riveting and the like. In the illustrated embodiment of the invention the tubing 12 is held in place by a pair of screws extending through the body part 15 of the clamp and partially through the wall of the tubing 12 in the manner now to be described.

In order to prevent damage to the clamp 14 when the lever 22 is in the lowered or locked position as shown in Figs. 1 and 3, a U-shaped support 38 is provided for engaging the lever part 29 when the clamp is in the locked position. This support comprises an arcuate base 39 and a pair of outwardly extending members 40 and 41 preferably formed integrally with the base part 39. The distance between the parallel members 40 and 41 is preferably made slightly greater than the thickness of the lever part 29 so that very little sidewise movement can be imparted to the lever when it is engaged by these members. This U-shaped member 38 is secured to the body part 15 by a pair of screws 42 extending through the openings 43 and 44 in the outer ends of the arcuate base 39 and threadably engaging a pair of openings 45 and 46 on either side of the flattened portion 37 of the body 15. In this way the base 39 of the U-shaped bracket member 38 will bridge the spring 31 and be secured firmly to the body 15. In order to secure the lower telescoping element 12 in position in the enlarged section 18 of the central opening 16, the element 12 is provided with a pair of threaded holes 45' and 46' in exact alignment with the openings 45 and 46 in the body part. The upper edge of the element 12 may also be provided with a U-shaped cut out 47 in order to provide ample room for the movement of the strip or spring 31 in the locking and unlocking operations. With this arrangement the length of the screws is adjusted so that each screw will extend through the wall of the body part 15 and partially through the wall of the tubing 12.

The locked position of the clamp is shown in Fig. 3 with the nose 28 of the cam 27 bearing against the spring 31 which in turn bears against the tubing element 11 and secures the latter in position in the clamp body 15. This clamping action takes place at a point wherein the element 11 is supported about its entire periphery by the narrowed portion 17 of the opening 16. In addition when the lever 22 of the clamp is in the closed position as shown in Fig. 3 it will be observed that the point of the nose part 28 of the cam 27 has moved slightly beyond a center point of maximum pressure so that the clamp will not accidentally loosen. It has been found that by properly coordinating the distance between the center of rotation of the cam 27 and the nose 28 of the cam with the thickness of the spring 31 that sufficient pressure can be applied to the tubing element 11 to hold it in position within the clamp and at the same time subjecting it to little if any deformation. Thus the outer surface of the tubing part 11 remains smooth and free of deformations that would interfere with the ease of adjustment of the element 11 relative to the element 12 and thereby overcomes another serious disadvantage of prior devices. Moreover by reason of the interposition of the strip or spring 31 between the cam 27 and the element 11 being clamped, forced movement of the element 11 in either direction will not loosen or even tend to loosen the clamp. This is particularly important in cases where the slidable elements are used in an upright position.

To release the element 11 for movement inwardly and outwardly of the element 12 the lever 22 is moved outwardly about the pivot pin 25 as shown in Fig. 4 of the drawings. In this position the nose 28 of the cam 27 extends outwardly away from the spring 31 and the spring itself moves out of pressure contact with the element 11 leaving the latter completely free to be moved into and out of the tube part 12.

While the foregoing embodiment of the invention has been illustrated as being fabricated of suitable metallic materials it is apparent that the clamp may also be fabricated of any other suitable material such as plastic, wood or the like. In addition, the U-shaped guide or support 38 for the lever 22 when in the locked position may be fabricated integrally with the body part 15 of the clamp or in certain cases may be omitted entirely. Moreover, by reason of the improved structure for locking the telescoping shafts one relative to the other dirt and corrosion will not interfere in any way with the operation of the lever since ample leverage is provided for the release of the pressure engagement of the nose 28 of the cam 27 and the spring 31 with the element 11. Merely moving the handle 30 of the lever 22 outwardly functions to completely disengage the lever and spring from the element 11 for free movement of that element. In prior known devices as, for instance, a clamp embodying a tapered thread in the end of outer telescoping shaft that is provided with longitudinal slots and a nut engaging the thread to urge the threaded sections into contact with the inner shaft, dirt and corrosion will seriously interfere with the free operation of the nut. In many cases even loosening the nut of such prior devices may not free the elements to move relative one of the other because the threaded sections are often moved inwardly with such force as to exceed their elastic limit. In that case pulling the elements apart or pushing them together frequently defaces the outer surface of the inner element to such an extent that the two ultimately become bound together and can no longer be easily adjusted. This is particularly the case when soft metals such as aluminum or the like are employed.

This invention has a variety of applications and may be used in connection with telescoping elements of any size or shape. For instance, telescoping table parts may be coupled by a clamp of this character secured to the outer table part at a convenient point on its periphery and arranged to bear against the inner telescoping table part. The clamp is also applicable to automobile bumpers supported by telescoping members to provide a quick and easy means for extending the bumpers inwardly or outwardly of the vehicle as may be desired.

A modified embodiment of the invention is shown generally in Figs. 7 and 8 for use in providing an adjustable rod 50 for supporting draperies. In this application the drapery rod 50 is provided with an outer element 51 and an inner element 52. The outer element 51 is pivotally secured at 51' to one side of a window so that the drapery 53 can be moved toward or away from the window as desired. The elements 51 and 52 are coupled together by a clamp 54 generally along the lines of the clamp shown in Figs. 1 through 6 but of somewhat smaller dimensions. Since the basic elements of these two clamps are identical like numbers have been applied to corresponding elements in each modification. The clamp of Fig. 8 however differs from the clamp shown in Figs. 1 through 6 in that the lever 22 in this embodiment of the invention is provided with a straight handle part 55 in place of the curved handle portion 30 shown in Figs.

2 and 3. In this way the clamp 54 will not interfere with the sliding of the curtain 53 over the rod and the clamp in the manner illustrated in the drawings. To loosen the clamp any suitable tool such as a screw driver or the like can be readily inserted between the handle part 55 of the lever 22 and the body 15 of the clamp 54 to facilitate moving the lever outwardly to release the inner element 52 and permit it to be moved longitudinally of the outer element 51. The lever 22, however, may preferably but not necessarily be provided with a sufficiently long handle to permit it to be locked by hand.

Another embodiment of the invention is shown in Figs. 9 and 10 for holding a pair of slidably mounted flat members in position one relative to the other. In this embodiment one of the flat or rectangular members 60 is provided with a U-shaped member that is welded or otherwise secured thereto along the lines 62 to provide a narrow channel or opening for slidably receiving the second flat or rectangular member 64. The member 60 is provided with an opening 63 extending therethrough which may be of any suitable configuration for the reception of the cam part 27 on the lever 22. The lever 22 is pivoted to a pair of lugs 23 and 24 by means of a suitable pin 25. Between the cam part 27 and the slidable member 64 there is a thin spring like member 31 that is forced firmly against the strip 64 when the lever 22 is in the position shown in the figures. When the lever is moved outwardly the member 31 is released so that the strip 64 can be displaced longitudinally of the strip 60. If desired a U-shaped bracket 41 may be employed to receive the end of the handle part 55 of lever 22 to prevent accidental damage to the lever when in the closed position.

From the above it is apparent that the adjustable clamp or connector in accordance with the invention provides a compact, efficient and effective device for securing telescoping or other sliding elements one to the other and is characterized by its effectiveness, simplicity, ease of operation and low cost.

While only certain embodiments of the invention have been shown and described, it is apparent that other modifications, alterations and changes may be made without departing from the true scope and spirit thereof.

What is claimed is:

A clamp for releasably securing two telescopically adjustable members one to the other comprising a tubular body member having an opening extending therethrough and an elongated slot in the wall of said body having its long axis aligned with the axis of said opening in the body, a pair of tabs carried by said body and extending outwardly therefrom in spaced relationship with the adjoining faces of the tabs being substantially coincident with said slot, one end of said central opening being enlarged from the adjoining end of said body to a point at least coincident with the adjoining end of said slot for reception of the larger of said telescopically adjustable members, the other end of said opening slidably receiving the other of said telescopically adjustable members, an elongated member of resilient material and of a width slightly less than the width of the slot secured at one end to said body and having its other end extending into the slot, said other end of the elongated member being curved outwardly out of contact with the smaller of said telescopically adjustable members, an operating handle pivotally secured to said tabs for movement relative thereto, said operating handle carrying an eccentric cam adjoining the pivoted end thereof and movable inwardly of said slot and against said resilient member when at least a portion of said operating handle is in parallel relationship to said body and movable outwardly of said slot when said handle is moved outwardly of the body and about the pivoted end thereof, said cam upon being urged inwardly of said slot contacting said resilient member and urging it forcibly against the smaller of said telescopically adjustable members to fix it in position relative to the body, said resilient member preventing displacement of the cam through longitudinal stresses that may be placed on the last said member, said cam being angularly positioned relative to said handle so that upon movement of the handle to a position substantially parallel to said body said cam will be moved at least slightly beyond a dead center position in contact with said resilient member so that the reactionary forces exerted by the smaller of said telescopically adjustable members and said resilient member will hold the operating lever in said parallel position and said cam in the clamping position.

References Cited in the file of this patent

UNITED STATES PATENTS

| | | |
|---|---|---|
| 625,020 | Chappuis | May 16, 1899 |
| 695,528 | Beckley | Mar. 18, 1902 |
| 2,556,348 | Thompson | June 12, 1951 |
| 2,628,854 | Gardner | Feb. 17, 1953 |

FOREIGN PATENTS

| | | |
|---|---|---|
| 702,271 | Great Britain | Jan. 13, 1954 |